United States Patent Office 2,993,576
Patented July 25, 1961

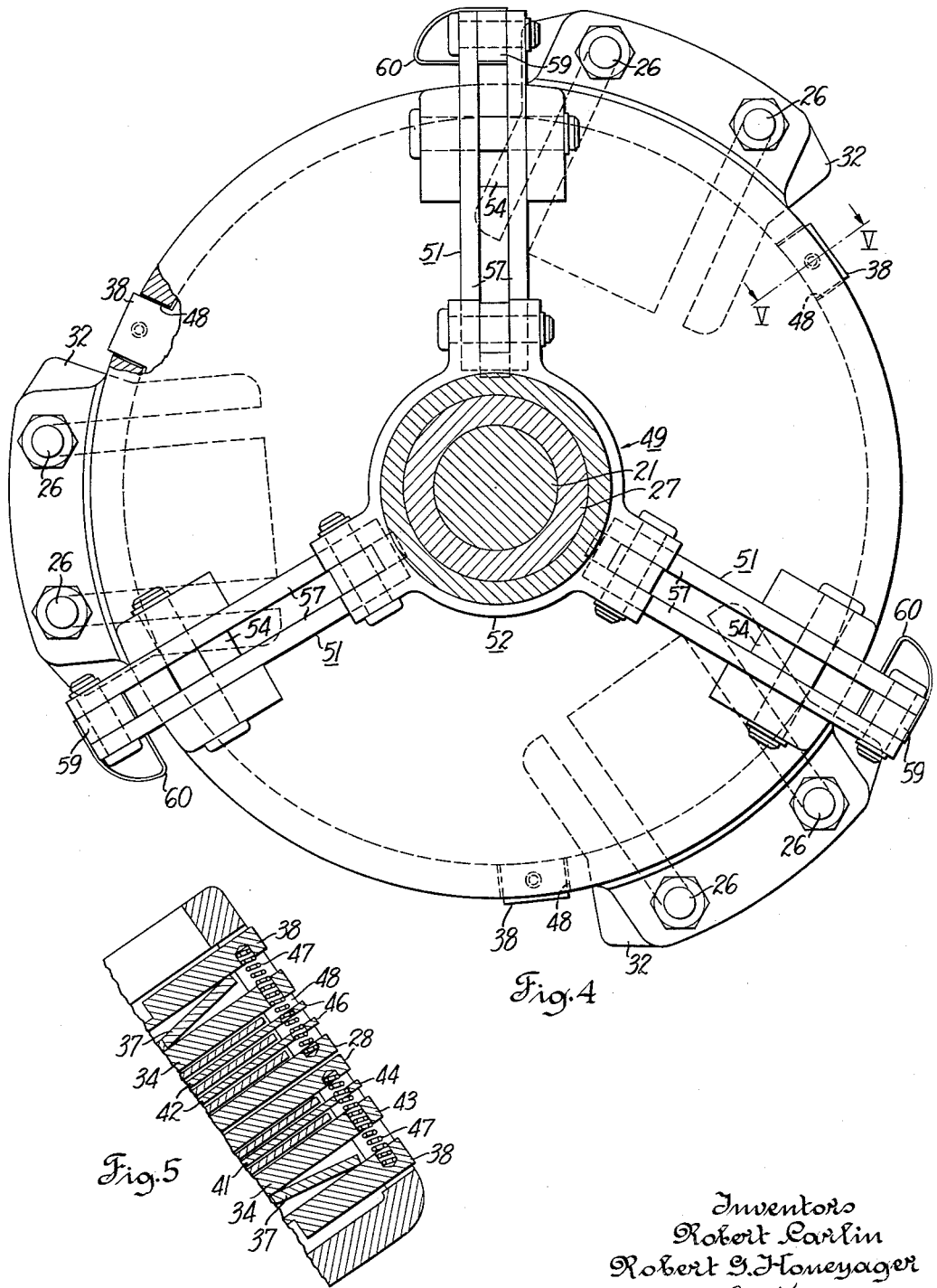

2,993,576
SELECTIVELY ENGAGEABLE DOUBLE CLUTCH
Robert Carlin, Greenfield, and Robert G. Honeyager,
Milwaukee, Wis., assignors to Allis-Chalmers Manufacturing Company, Milwaukee, Wis.
Filed Sept. 3, 1957, Ser. No. 681,696
1 Claim. (Cl. 192—48)

This invention relates to disk type friction clutches in general and is more particularly concerned with an over-center two way disk type friction clutch of the heavy duty type such as that used in farm tractors, road construction vehicles and the like.

Vehicles which operate under conditions of heavy loads and variable ground conditions are found to be considerably more efficient if they are provided with a quick shift clutch mechanism. In the case of a farm tractor it is not uncommon for the tractor to be required to pull an earth working tool through loose soil and then clay or mud during the same operation. While working in loose soil, the tractor may perform satisfactorily in one gear range whereas it is quite likely to stall when clay or mud is encountered. With the usual transmission, it is practically impossible to shift a working farm tractor on the go. In most cases, the tractor will come to a complete stop before the transmission can be shifted. This is undesirable to the tractor operator both from the standpoint of the time involved and also the work involved in shifting the transmission.

To overcome this undesirable characteristic, tractors have been provided with auxiliary clutches which enable the operator to shift from one range and gear ratio to another without causing the tractor to come to a complete stop. These auxiliary or quick shift clutches are usually of the band type or disk type. Applicants' invention pertains to the disk type clutch and includes features both novel and advantageous in the application of quick shift friction clutches.

It is therefore an object of the invention to provide a quick shift clutch of the hereinbefore mentioned type which is inexpensive to manufacture and simple of construction.

A further object of the invention is to provide a self-adjusting two way friction clutch with a manual adjustment so as to allow resetting of the self-adjusting feature.

Another object of the invention is to provide a self-adjusting two way friction clutch with a pressure plate assembly which can be preassembled and applied as a unit to the clutch mechanism.

A further object of the invention is to provide a clutch of the hereinbefore mentioned type with a cam face having a double angled bearing surface to insure quick and easy engagement of the clutch mechanism.

Another object of the invention is to provide a clutch of the hereinbefore mentioned type with a shifter lever having diverging camming surfaces.

The foregoing and other objects and advantages of the invention will become more fully apparent from the following description of the invention shown in the accompanying drawings. Referring to the drawings, in which like reference characters designate the same or similar parts of the various views:

FIG. 4 is an end or axial view of the clutch drum showing the lever arm assemblies; and FIG. 5 is a section taken along the lines V—V in FIG. 4.

Figure 1:
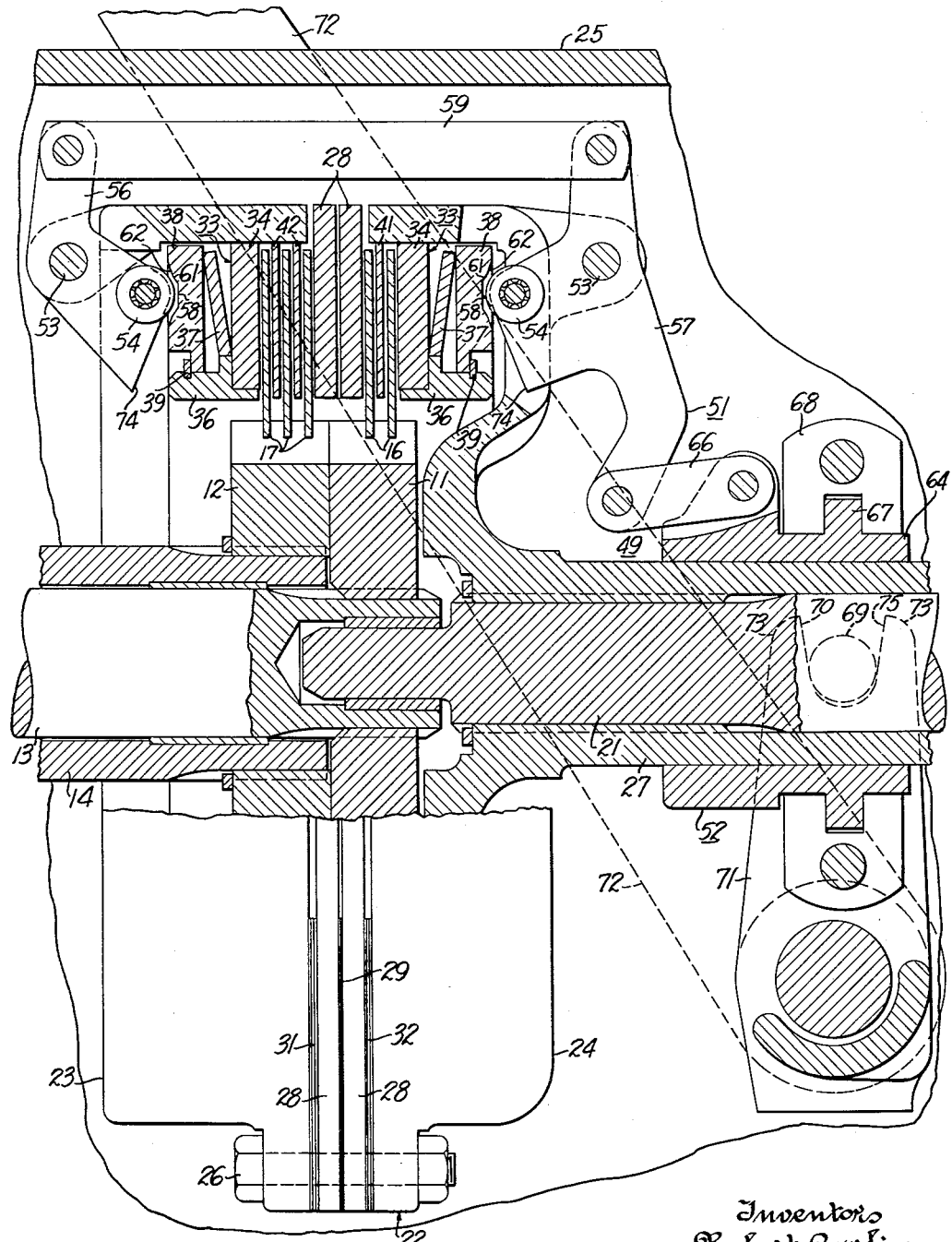
FIG. 1 is a partial vertical sectional view through a clutch mechanism made in accordance with the invention.

As shown in FIG. 1, gears 11 and 12 are driving members which rotate simultaneously in the same direction but at different speeds. Gear 11 is splined to shaft 13 which rotates at engine speed. Gear 12 is splined to hollow or quill shaft 14 which rotates at a fraction of the speed of shaft 13 through an underdrive gear set (not shown). Rotation of both input shafts 13 and 14 is controlled by a master engine clutch (not shown).

Two clutch disks 16 and three clutch disks 17 are axially slidably positioned on gears 11 and 12 respectively. The disks are notched internally forming an internal ring of teeth which mate with the teeth of gears 11 and 12. This arrangement allows the disks to be positioned on the gears in any axial position and also provides a positive drive for transmitting torque.

Transmission input shaft or clutch output shaft 21 is journaled in drive shaft 13 and extends rearwardly to a main change speed transmission (not shown). Mounted on the forward end of transmission input shaft 21 is a clutch drum 22 including front and rear carrier plates 23 and 24 respectively. These plates are rigidly fastened together by a series of cap screws or fastening means 26. A shaft extension 27 of the rear carrier plate 24 is spline connected to transmission input shaft 21 so that the clutch drum 22 rotates with the shaft 21. The drum 23 is contained in a clutch housing 25.

Fastened between front and rear carrier plates 23 and 24 and rigidly held thereto by cap screws 26 are two identical backing plates 28 which extend radially inward from the periphery of the carrier plates. Shims 29 position backing plates 28 relative to one another and shims 31 and 32 position backing plates 28 relative to carrier plates 23 and 24 respectively. These shims and the positioning of backing plates 28 involve an important novel feature of the invention and will be explained more fully in connection with the adjustment of the clutch which is necessitated by wear of the clutch disks or friction elements 16 and 17.

Spaced axially from the outer sides of backing plates 28 and slidably mounted in the front and rear carrier plates 23 and 24 respectively are front and rear pressure plate assemblies 33. Since both of the assemblies are identical only one will be described in detail. Pressure plate assembly 33 includes a pressure plate 34, a cylindrically shaped horizontally extending carrier 36 integrally joined with the pressure plate 34, a Belleville type spring washer 37, thrust plate 38, and a snap ring 39 positioned in a groove formed in the periphery of carrier ring 36 and axially spaced from pressure plate 34. The spring washer 37 is placed on carrier 36 and compressed against pressure plate 34 when thrust plate 38 is positioned on carrier ring 36 on the inner side of snap ring 39. With this arrangement of parts, applicant has provided a novel pressure plate assembly which can be preassembled resulting in simplified manufacture, assembly and repair of the clutch mechanism.

As shown in FIG. 1, the right hand portion of the clutch mechanism has a single friction ring 41 interposed between clutch disks 16 and the left hand side of the clutch mechanism has two friction rings 42 alternately positioned between clutch disks 17. Only one friction ring 41 is provided on the right hand side of the clutch mechanism as this represents the high speed low torque drive. In order to adequately transmit the torque through the left hand side of the clutch, additional clutch disks and friction rings are provided.

In order to insure proper spacing the elements of the pressure plate assembly 33 and the friction rings 41 and 42 and also to provide axial movement of these parts relative to the clutch drum 22 applicant has devised a novel means of connection. The thrust plate 38, pressure plate 34 and friction rings or elements 41 and 42 are radially identical, each being circular and having three radially extending tongues equally spaced around their peripheries (see FIG. 4 and the cutaway portion thereof). Referring to FIG. 5, the tongues 43, 44 and 46 of the pressure plate 34, friction ring 41 and friction ring 42 respectively, have aligned holes therein through which passes a resilient means or coil spring 47. Opposite ends of the coil spring are held in circular seats cut into opposing faces of backing plate 28 and thrust plate 38. The outward pressure exerted by the coil spring on thrust plate 38 insures adequate spacing between the backing plate and thrust plate for clutch discs 16 and 17 and friction rings 41 and 42 when the mating elements are in a disengaged position. Because these elements and the clutch disks 16 and 17 are free to move in an axial direction, they center themselves relative to one another upon relative rotation.

The tongues 43, 44 and 46 perform a dual service in that they not only retain the coil spring 47 but they also provide a means for attaching the pressure plate assembly 33 and friction rings 41 and 42 to the clutch drum 22. Each carrier plate 23 and 24 of the clutch drum 22 has three axially extending recesses 48 (see FIG. 4) formed in their respective peripheries. These recesses are preferably equally spaced from one another and are necessarily alignable with the tongues 43, 44 and 46. Each recess extends axially from the inner opposing surfaces of the carrier plates 23 and 24 and terminates adjacent to the rear surface of the carrier plates. Since the recess does not extend through the rear face of the carrier plates this rear surface forms a backing for the thrust plate 38 and retains the pressure plate assembly 33 and friction rings 41 and 42 in one direction. The backing plates 28 retain these elements in the opposite direction.

As shown in FIGS. 1 and 4, an actuating means generally designed 49 comprises three overcenter lever arm assemblies or engaging means 51 and the clutch shiftable means 52. Inasmuch as each lever assembly is identical, only one will be described. Pivot pins 53 are journaled on carrier plates 23 and 24 and support members or engaging levers 56 and 57 respectively. Cam follower rollers 54 are rotatably mounted on the inner ends of levers 56 and 57 for engagement with cam face 58 formed on thrust plates 38. The levers 56 and 57 are interconnected by a third member or push pull rod 59 which is pivotally connected between the upper ends of levers 56 and 57. With the levers 56 and 57 connected by the push pull rod 59 each side of the clutch mechanism is controlled in relation to the other side. Thus applicant has provided a clutch which is capable of alternate engagement of opposite sides and which can also be placed in a neutral position. These three positions of the clutch mechanism will become amply clear when the operation of the clutch is described later.

It should be pointed out here that the leading edge of the push pull rod 59 has been provided with a rounded surface 60. Applicants' clutch is designed to rotate partially submerged in oil and rounded leading edge of rod 59 cuts through the surface of the oil rather than hitting it with a flat surface. This decreases the churning of the oil resulting in less energy loss.

Figure 2:
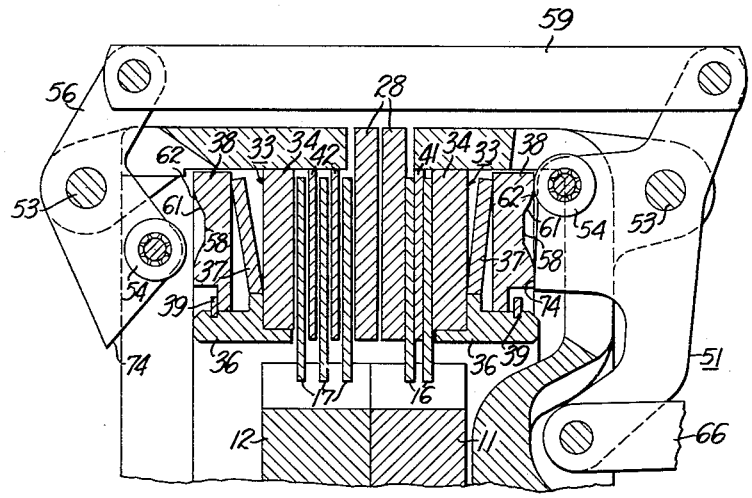
FIG. 2 shows the top portion of the sectional view of FIG. 1 with the right hand portion of the clutch mechanism engaged.
Figure 3:
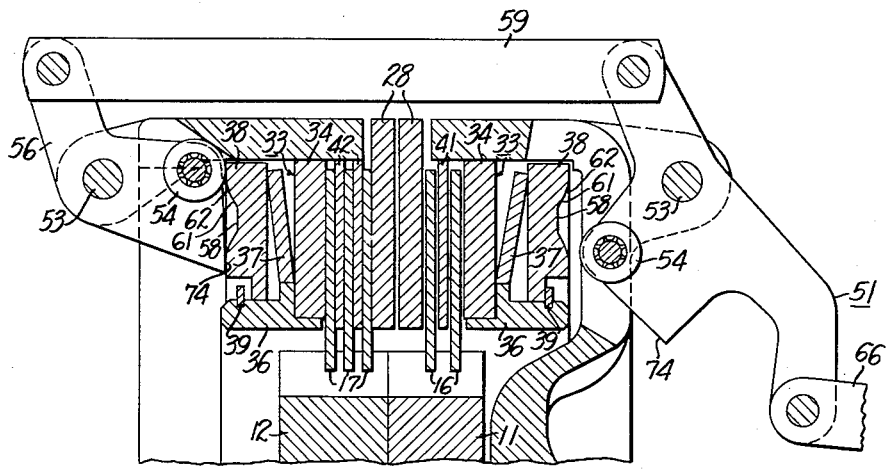
FIG. 3 is a sectional view similar to FIG. 2 showing the left hand portion of the clutch mechanism engaged.

As is shown in FIGS. 1 through 3, thrust plate 38 has been provided with a double angled cam face 58 which is acted upon by roller 54. Since the farm tractors and other vehicles, wherein this clutch is likely to be used, have considerable drag, any momentary interruption of power slows the vehicle down considerably. In designing a clutch such as the subject mechanism, it is therefore necessary to have quick engagement of the rotating elements so that the forward momentum of the vehicle is not appreciably interrupted before the drive is continued. To accomplish this, applicants have provided the thrust plate 38 with a sharply angled bearing surface 61 which results in a large displacement of the thrust plate 38 as a result of a relatively small movement of the roller 54. This insures quick engagement of the friction rings 41 and 42 with the clutch disks 16 and 17. However, because of the friction in the actuating means 49 and the force required to adequately load the clutch disks, a large force must be exerted by the operator in order to properly engage the clutch. To overcome this large force requirement and yet provide the clutch with the necessary quick engagement, the applicants have provided the cam face of thrust plate 38 with a double angle. With this arrangement the initial contact between roller 54 and the sharply angled surface 61 results in quick engagement of the clutch mechanism. Further movement of the lever 57 causes roller 54 to pass over bearing surface 62 which is at a smaller angle with the surface of the side of thrust plate 38 therefore resulting in a lower force requirement on the part of the operator to adequately load the clutch.

As was previously mentioned, shims 29, 31 and 32 are provided between the backing plates 28 and between the front and rear carrier plates 23 and 24 and the backing plates. This arrangement of shims provides a novel method of adjusting the clutch mechanism and utilizes the clutch disk and friction rings to their fullest capacity. One of the most serious disadvantages of a friction clutch such as disclosed herein resides in the fact that considerable wear is experienced between the clutch disks 16 and 17 and the friction rings 41 and 42. In the past, the operator was required to frequently adjust the clutch mechanism or to replace the wearing elements. In many instances this was not only an expensive operation but was quite difficult due to the tolerances involved. To overcome this replacement and adjustment problem, springs such as the Belleville washers 37 were inserted in clutch mechanism so that self-adjustment of the mechanism would result as wear was experienced between the clutch disks and friction rings. Referring to FIG. 2 which shows the right hand side of the clutch engaged, it will be noted that the Belleville washer 37 has been compressed because of the greater axial displacement of thrust plate 38 than pressure plate 34. This is apparent from the gap between thrust plate 38 and snap ring 39. The actual force holding clutch disks 16 and friction ring 41 together passes through the Belleville washer 37 resulting in a resilient loading of the clutch. As the clutch disks and friction rings wear the washer 37 expands, keeping them in contact. However, when the wear has been such that the Belleville washer has expanded to the point of bringing thrust plate 38 and snap ring 39 into contact, further self-adjustment is impossible.

Self-adjustment of friction clutches has proven to be considerably helpful. However, when the limit of the self-adjustment is reached in many instances considerable life remains in the friction ring and the clutch disks. In many cases this remaining life is wasted because of a lack of further manual adjustment. The applicants have provided a novel means of utilizing the clutch disks and friction rings to their fullest extent by including an incomplex and inexpensive manual adjusting feature on their clutch. After the friction surfaces have worn to the extent that pressure plate 34 does not contact clutch disk 16 after full displacement of pressure plate assembly 33 further use of the clutch is not impossible. If, however, the backing plates 28 could be moved closer to the pressure plate 34 any additional life in the clutch disks and friction rings could be utilized. This is possible in applicants' clutch by adding more shims between the backing plates 28. However, in so doing, it is necessary to retain the critical spacing between pivot pins 53 in order for the lever arm assembly to operate properly. In ordinary practice, it would be quite difficult for the average operator of a vehicle containing a clutch similar to the subject invention to adjust the clutch mechanism and retain the critical spacing of the pivot pins. With the novel provision of shims 29, 31 and 32, applicants have provided a means of adjusting the clutch mechanism which is both incomplex and accurate. By removing a portion of the shims 31 and 32 and inserting these shims between the backing plates 28 with the shims 29, the space between the backing plates 28 and pressure plates 34 has been narrowed allowing the worn clutch disks and friction rings to be brought into engagement by actuation of the lever arms. The critical spacing between pivot pins 53 is retained as the total thickness of shims has not changed. From this point the usual self-adjustment is reinstated.

The clutch shiftable means 52 is shown in FIG. 1. Shaft extension 27 integrally formed with carrier plate 24 and spline connected to a main change speed transmission input shaft 21 has slidably mounted thereon a sleeve 64. A downward extension of engaging lever 57 is connected by a pivot link 66 to the forward end of sleeve 64. An annular flange 67 formed on sleeve 64 fits into a groove formed in a collar 68. Trunnions 69 integrally formed with collar 68 are received by the bifurcated end of a control or shifter lever 71. Selective axial movement of sleeve 64 and alternate engagement of the clutch mechanism is provided by a hand lever 72 which is rigidly connected to the lower end of shifter lever 71. The other end of the shifter lever 71 is bifurcated, having a pair of laterally spaced portions or legs 73. Each portion is provided with a pair of camming surfaces 70 and 75 which engage the trunnions 69.

It should be noted that the camming surfaces 70 and 75 of the bifurcated end of the shifter lever 71 are not parallel to one another but extend outwardly in a diverging direction. It is common practice to employe a shifter lever having parallel camming surfaces when a single acting clutch is involved. However, in some single acting clutches and in many double acting clutches where a shifter lever with parallel camming surfaces is employed, an antifriction bearing is required between the flange 67 and collar 68. This is necessary because of the large friction force developed between the contact surfaces of these elements. This friction force, which in some instances reaches sufficient proportions to cause the flange 67 and collar 68 to freeze, results from a wedging action between the trunnion and the camming surfaces of the shifter lever leg. Applicants have found that this wedging action can be overcome by providing the lever 71 with diverging camming surfaces 70 and 75. The size of the diverging angle of the camming surfaces is a function of the length of the shifter lever and the amount of angular displacement of the lever from a no load position to a maximum load position. In applicants' clutch, this optimum diverging angle has been found to be approximately 26°. That is, the angle between a vertical line through the pivoting axis of the lever 72 and the diverging surface of the leg 73 is equal to 26°. As the legs 73 in FIG. 1 are shifted to the left, the trunnion tends to rotate with the sleeve 27 because of the friction between flange 67 and collar 68. The plane of rotation of the trunnion 69 is vertical. As the lever 71 is pivoted to the left the right hand diverging surface 75 of the leg 73 approaches a vertical direction. At the maximum loading condition this surface is in a vertical plane parallel to the plane of rotation of the trunnion 69. In this manner no wedging of the trunnion and the camming surface 75 takes place. If the sleeve 27 is rotating in a clockwise direction as viewed from the right hand end of FIG. 1, the trunnion furthest from the viewer would be in the base of the lever 71 and the trunnion nearest the viewer would be slightly above this trunnion and contacted by the right hand surface of the leg 73.

In operation the above described clutch mechanism is used in conjunction with a vehicle such as a farm tractor wherein a quick shift is desired from a high range to a low range increasing the driving torque of the vehicle without seriously interrupting the forward momentum. With the engine clutch positioned forward of the gears 11 and 12 both of these gears will be driven whenever the engine clutch is engaged. Due to an underdrive gear train or any convenient method of speed reduction quill shaft 14 rotates at a lower speed than shaft 13. In order to drive the vehicle the clutch mechanism described herein must be in either the high or low range as shown in FIGS. 2 and 3, respectively. However, the subject clutch mechanism is provided with a neutral position should the operator desire to stop the vehicle without disengaging the main clutch. This is a decided advantage in the case of a power take-off drive which is connected to the engine power line forward of the quick shift clutch yet rearward of the engine clutch. As shown in FIG. 1, the clutch is in the neutral position and the transmission input shaft 21 is not rotating, however, shafts 13 and 14 are rotating and a power take-off drive connected forward of the subject clutch mechanism would be rotating.

Referring to FIG. 1, if the operator should desire to engage the high range side of the clutch as shown in FIG. 2, the manual lever 72 is moved to the left forcing clutch collar 68 and sleeve 64 to the left, pivoting lever 57 about pivot pin 53 and forcing the pressure plate assembly 33 to the left resulting in contact between clutch disks 16 and friction ring 41. The cam follower roller 54 contacts the bearing surface 61 first and then moves into contact with bearing surface 62. A small additional upward movement of roller 54 causes its center to pass beyond the horizontal center line of pivot pin 53 and the lever has then reached an overcenter position. This overcenter position holds the clutch disks 16 and friction ring 41 in torque transmitting engagement until the operator moves the hand control lever 72 to the right. A stop or abutment surface 74 is provided on each of the levers 56 and 57 to hold the levers from pivoting too far beyond the overcenter position.

If the vehicle should experience difficulty and the operator desires a lower speed drive with the resulting higher available torque the manual lever 72 is moved to the right resulting in a right hand shifting of clutch collar 68. The lever 57 pivots in a counterclockwise direction disengaging the high range side of the clutch. At the same time the push pull rod 59 pivots lever 56 in a counterclockwise direction engaging the low range side of the clutch. It should now be apparent that both sides of the clutch cannot be engaged at the same time because of the spacing between pivot pins 53 and the length of push pull rod 59.

It should be understood that it is not intended to limit the invention to the exact details of construction herein described with reference to the drawings, and it is intended to include such other forms and modifications as are embraced by the appended claim.

What is claimed is:

A double friction clutch of the type having first and second clutch disks connected respectively to first and second relatively rotating concentric input shafts comprising: an output shaft; a clutch drum surrounding said clutch disks having a pair of coaxially aligned carrier plates presenting opposed axially extending annular flanges, one of said carrier plates being connected to said output shaft for rotation therewith; attaching means releasably connecting said carrier plates to one another; first and second axially spaced annular pressure plates contained within said drum for axial sliding movement relative thereto and rotation therewith, said first and second pressure plates being positioned, respectively, adjacent to and on the outer sides of said first and second clutch disks; first and second annular backing plates connected to said drum for rotation therewith and being disposed between and adjacent respectively said first and second clutch disks; actuating means for selectively clamping said clutch disks in torque transmitting engagement between their adjacent backing plate and pressure plate including first and second remotely spaced members pivotally connected to said carrier plates and equally spaced from said first and second backing plates respectively; first spacing shims removably positioned between said backing plates; second spacing shims removably positioned between one of said backing plates and said one of said carrier plates; and third spacing shims removably positioned between the other of said backing plates and the other of said carrier plates, said shims being interchangeable thereby permitting repositioning of said shims to change the spacing between said backing plates and between corresponding backing and carrier plates without changing the spacing between the pivotal connections of said first and second remotely spaced members.

References Cited in the file of this patent

UNITED STATES PATENTS

| | | |
|---|---|---|
| 1,346,078 | Couch | July 6, 1920 |
| 1,675,703 | Gade | July 3, 1928 |
| 1,790,284 | Reed | Jan. 27, 1931 |
| 1,845,332 | Reece et al. | Feb. 16, 1932 |
| 2,140,619 | Dunkelow | Dec. 20, 1938 |
| 2,155,820 | Eastburn et al. | Apr. 25, 1939 |
| 2,278,960 | Wilson | Apr. 7, 1942 |
| 2,366,643 | Nutt | Jan. 2, 1945 |
| 2,439,611 | Nabstedt | Apr. 13, 1948 |
| 2,462,944 | Cardwell et al. | Mar. 1, 1949 |
| 2,505,450 | Wemp | Apr. 25, 1950 |
| 2,546,064 | Gerst | Mar. 20, 1951 |
| 2,548,269 | Ochtman | Apr. 10, 1951 |
| 2,776,031 | Turnquist et al. | Jan. 1, 1957 |